US008880668B2

(12) United States Patent
Ebrahimi et al.

(10) Patent No.: US 8,880,668 B2
(45) Date of Patent: Nov. 4, 2014

(54) METHOD AND SYSTEM FOR INTEGRATING DATA FROM MULTIPLE SOURCES (75) Inventors: Fari Ebrahimi, Basking Ridge, NJ (US); Walid Hassan, Irving, TX (US); Kannan Thillai Chidambaram, Irving, TX (US); Saif Daresalamwala, Irving, TX (US); Thillai Ponnambalam, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 427 days.

(21) Appl. No.: 13/036,122

(22) Filed: Feb. 28, 2011

(65) Prior Publication Data
US 2012/0221623 A1  Aug. 30, 2012

(51) Int. Cl.
*G06F 15/173* (2006.01)
*G06F 11/32* (2006.01)
*G06F 11/30* (2006.01)
*G06F 11/07* (2006.01)
*H04L 1/00* (2006.01)
*G06F 11/00* (2006.01)
*H04L 1/24* (2006.01)
*H04L 29/08* (2006.01)

(52) U.S. Cl.
CPC .......... *G06F 11/328* (2013.01); *G06F 11/3017* (2013.01); *G06F 11/07* (2013.01); *H04L 1/00* (2013.01); *G06F 11/006* (2013.01); *H04L 1/24* (2013.01); *G06F 11/008* (2013.01); *G06F 11/004* (2013.01); *H04L 29/08135* (2013.01); *G06F 11/3006* (2013.01); *G06F 11/3055* (2013.01); *G06F 11/3082* (2013.01)
USPC .......... 709/223; 709/202; 709/217; 714/6.12; 714/15; 714/20; 714/25

(58) Field of Classification Search
USPC ........ 709/202, 217, 224; 714/6.12, 15, 20, 25
See application file for complete search history.

(56) References Cited

U.S. PATENT DOCUMENTS

| | | | | |
|---|---|---|---|---|
| 4,982,402 A * | 1/1991 | Beaven et al. | ................... | 714/15 |
| 5,440,726 A * | 8/1995 | Fuchs et al. | ...................... | 714/20 |
| 5,504,859 A * | 4/1996 | Gustafson et al. | .............. | 714/11 |
| 6,044,475 A * | 3/2000 | Chung et al. | .................... | 714/15 |
| 6,349,238 B1 * | 2/2002 | Gabbita et al. | ............... | 700/101 |
| 7,216,163 B2 * | 5/2007 | Sinn | ................................. | 709/224 |
| 7,349,912 B2 * | 3/2008 | Delany et al. | .................. | 707/694 |
| 7,467,142 B2 * | 12/2008 | Sinn et al. | ............................. | 1/1 |
| 7,475,136 B2 * | 1/2009 | Sinn | ............................. | 709/224 |
| 7,818,197 B2 * | 10/2010 | Cho et al. | ...................... | 705/7.21 |
| 7,818,750 B2 * | 10/2010 | Dunki et al. | .................... | 718/106 |
| 8,375,244 B2 * | 2/2013 | Bobak et al. | ...................... | 714/3 |
| 2003/0191831 A1 * | 10/2003 | Hu et al. | ........................ | 709/223 |
| 2005/0060340 A1 * | 3/2005 | Sommerfield et al. | ........ | 707/102 |
| 2007/0198676 A1 * | 8/2007 | Vertes | ............................ | 709/223 |
| 2010/0299559 A1 * | 11/2010 | Randimbivololona | .......... | 714/15 |

* cited by examiner

Primary Examiner — Michael Y Won (57) ABSTRACT

An approach is provided for integrating data. Data is collected from one or more source systems and workflow data is extracted from the collected data. One or more predetermined tasks associated with execution of a workflow based on the workflow data are identified. Status information relating to progress of the workflow towards completion is estimated by correlating the workflow data with the one or more predetermined tasks.

13 Claims, 10 Drawing Sheets

METHOD AND SYSTEM FOR INTEGRATING DATA FROM MULTIPLE SOURCES

BACKGROUND INFORMATION

Computing and communication systems are continually being improved and upgraded with newer hardware and software to meet the growing coordination, information processing, and communication demands. To operate effectively, large and small entities (e.g., corporations, universities, government agencies, small businesses, etc.) often require great amounts of information processing and communicative efforts among team members. Operating an entity includes many core aspects that require great amounts of time and effort. One important aspect of operating an entity is the process of executing financial accounting, such as executing financial accounting at the end of a term period. Depending on the size and complexity of the entity, multiple sources, including external systems, may be needed for their respective inputs to assist in the financial accounting. Although many of the other core aspects of operating an entity have become automated, underlying functions and processes, such as financial accounting, continue to require a significant amount of manual production, which may include handwritten communications. To improve accuracy and efficiency, significant efforts have been made to provide automated monitoring and status reporting via a seamless integration tool. It is typically tedious and unwieldy to perform an integration of data, especially from a combination of multiple sources that may be strongly decoupled and disparate from each other.

Therefore, there is a need for an approach that enables efficient integration of data, particularly from multiple sources.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for providing data integration are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to integrating data relating to business and telecommunication services, it is contemplated that various exemplary embodiments are also applicable to other services.

Figure 1:
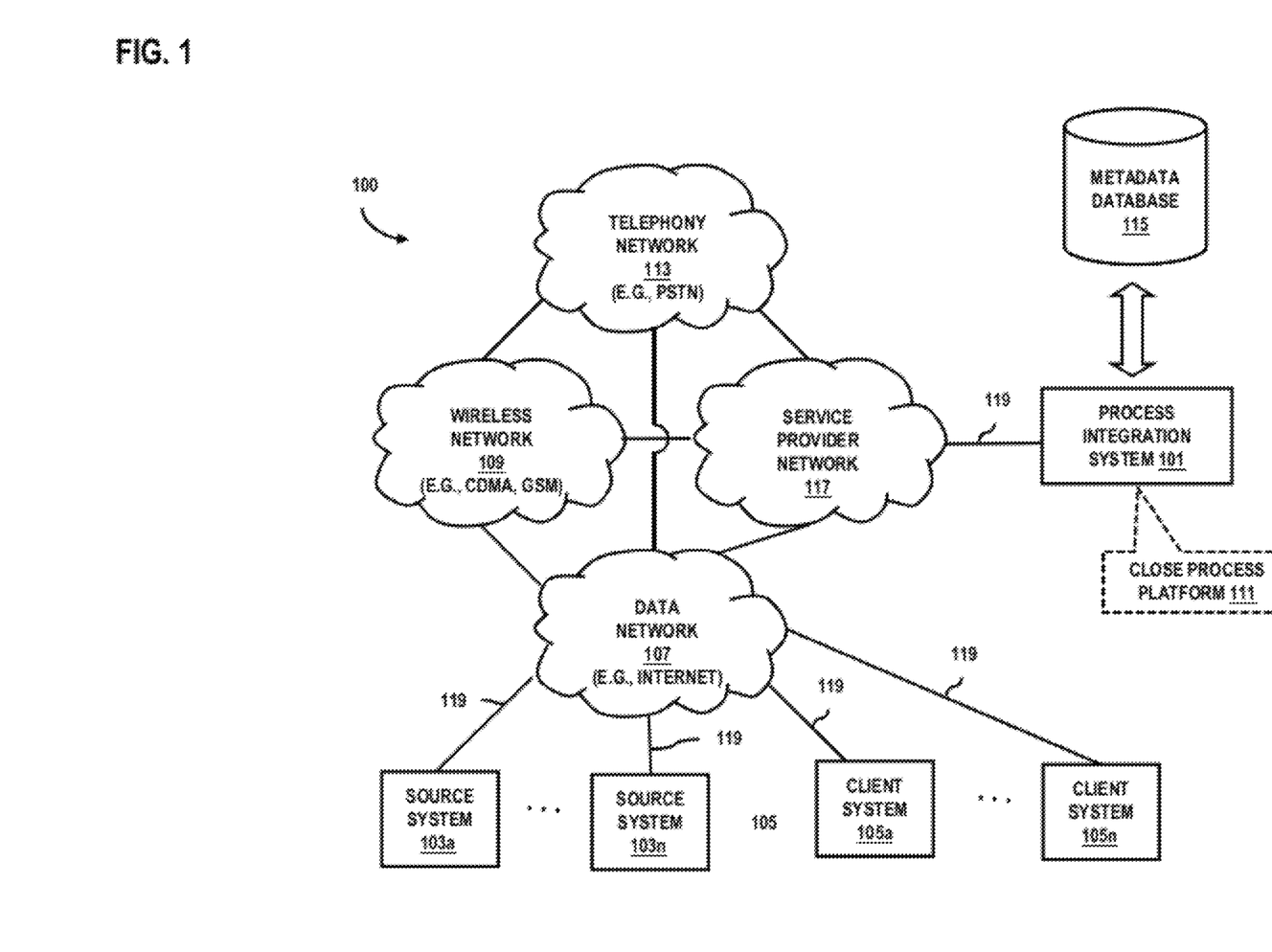
FIG. 1 is a diagram of a system capable of providing integration of data from multiple sources, according to an exemplary embodiment.

FIG. 1 is a diagram of a system capable of providing integration of data from multiple sources, according to an exemplary embodiment. For the purposes of illustration, system 100 is described with respect to a mechanism for specifically integrating data from multiple sources, including external systems, that are associated with a data network; however, the illustration may be applied to integrating essentially any type of data from any kind of source.

System 100 includes a process integration system 101 that has connectivity to one or more source (or feeder) systems 103. The process integration system (or data processing system) 101 is responsible for integrating data collected from the one or more source systems 103. The process integration system 101 is also responsible for providing a portal for one or more client systems 105 to request and monitor status information relating to the workflow of one or more tasks that may be predetermined. The process integration system 101 may include a close process platform 111 for performing specific duties, for example, a scheduled or time-sensitive close process for business and/or operational matters. For the purposes of illustration, a service provider network 117 may include the process integration system 101; under this arrangement, the process integration (or data processing) service can be provided as a managed service by the service provider network 117.

As used herein, a "source system" refers to a source for data, which can be presented in a variety of forms. For example, process integration system 101 collects or receives files containing data from one or more source systems 103 and processes the data for storing and for reporting a determined status to one or more client systems 105. The data can be stored in any form of memory, such as metadata database 115. For purposes of illustration, metadata database 115 is depicted as a separate entity from that of the process integration system 101. However, in exemplary embodiments, process integration system 101 may include the metadata database 115, and/or any other form of memory. The source systems 103 can be associated with a single entity (organization, business, individual, etc.) or multiple distinct entities. Similarly, the client system 105 can be associated with a single entity (organization, business, individual, etc.) or multiple distinct entities. The data collected from the one or more source systems can include data from various sources. For example, the data can be from a single system or multiple systems, can be in the form of online analytical processing (OLAP) cubes built from the metadata database 115 to which data has been uploaded, and can be data that moves from one system to another system, etc. While specific reference will be made thereto, it is contemplated that the system 100 may embody many forms and include multiple and/or alternative components and facilities.

As mentioned, an important aspect of operating an entity is the process of executing financial accounting, which may require a great amount of time and effort. In a typical case, financial accounting is periodically executed, for instance, at the end of a particular period (e.g., day, week, month, etc.). During this process, which may be referred to as a periodic close process, the necessary information associated with financial accounting may come from numerous sources, such as the many departments and members within a business entity, other entities that service the business entity, business clients, etc. As a significant portion of financial accounting continues to require manual production, the process of integrating financial data can be a difficult and confusing series of steps, especially because the information may come from multiple sources that may be strongly decoupled and disparate from each other. By way of example, each member associated with the periodic close process (e.g., the various functional or technical teams/members) may utilize different means of communication (e.g., emails, telephone calls, instant messaging, in-person conversations, etc.), and may provide data in different formats, which may cause confusion and/or delay. Moreover, there may be a lack of adequate automated monitoring and status reporting, as well as communication gaps between teams/members. As a result, the close status may not be known to those responsible (e.g., supervisors, executives, etc.) for completing the close process. Although each team may issue "alarms" to other teams for missed files and processes, the "alarms" may not be considered by all of those who are involved in the integration process because of manual and disparate processes (e.g., different means of communication, data delivered in different formats).

As such, the process integration system 101 serves as a bidirectional communication gap among the one or more sources systems 103 and the one or more client systems 105, and between the one or more source systems 103 and the one or more client systems 105. The one or more source systems can include a messaging application (e.g., email application, instant messaging application, etc.) and a productivity application (e.g., word processing application, graphic arts application, etc.). The process integration system 101 is asynchronous system that can provide responses through extensible markup language (XML), web service calls, etc. For example, the process integration system 101 can provide asynchronous responses through web service description language (WSDL) calls. The one or more source systems 103 and the one or more client systems 105 can communicate with the system 100 using various communications modes. In certain embodiments, the one or more source systems 103 and the client systems 105 can communicate with the process integration system 101 using web service calls, emails, telephone calls, in-person conversations, instant messaging chats, etc. For example, the source systems 103 and the client systems 105 may be members of an organization, in which the client systems 105 correspond to supervisors of the sources systems 103. In such a scenario, the supervisors may utilize the process integration system 101 to obtain reports containing status information relating to progress of the workflow towards completion, such that status information is estimated by correlating the workflow data with the one or more predetermined tasks. Whereby the process integration system 101 collects data from sources systems 103 via emails, and then, extracts the workflow data for use in a format that the supervisors of the client systems 105 are able to utilize.

In some embodiments, the source systems 103 and client systems 105 utilize data management systems, wherein data can be stored in one or more data containers. Each container may contain records, and the data within each record may be organized into one or more fields. For example, in relational database systems, the data containers are referred to as tables, the records are referred to as rows, and the fields are referred to as columns. In object-oriented databases, the data containers are referred to as object classes, the records are referred to as objects, and the fields are referred to as attributes. In addition, the one or more data containers may contain user and system profiles. Other database architectures may use other terminology.

The client system 105 and the source system 103 may include any customer premise equipment (CPE) capable of sending and/or receiving data or information over one or more of networks 107, 109, 113, and 117. For instance, the client system 105 and the source system 103 may include a voice terminal that may be any suitable plain old telephone service (POTS) device, facsimile machine, etc., a mobile terminal that may be any cellular phone, radiophone, satellite phone, smart phone, wireless phone, or any other suitable mobile device, such as a personal digital assistant (PDA), pocket personal computer, tablet, customized hardware, etc.; a computing device that may be any suitable computing device, such as a VoIP phone, skinny client control protocol (SCCP) phone, session initiation protocol (SIP) phone, IP phone, personal computer, softphone, workstation, terminal, server, etc.

By way of example, source system 103 may be managed by a telephone service provider; as such, source system 103 can relate to a central office, a tandem office or any other entity that supplies data files to be integrated by the process integration system 101. The client system 105 may be managed by a telephone service provider or any other entity such as a forecasting authority (e.g., National Forecasting and Planning System (NFPS)), different from the telephone service provider that manages the source system 103, which requires access to the integrated data. Once data such as information associated with the status of the execution of a workflow from each of the source systems 103 is integrated by process integration system 101, the data (e.g., data associated with the status of a workflow), as well as status information, can be made available to the client system 105 and used for various purposes, such as monitoring or completing a close process (e.g., financial accounting). For example, the process integration system 101 may estimate status information relating to one or more tasks and report such estimated status information to the client system 105. According to certain embodiments, each source system 103 and client system 105 may utilize different data formats for data of common interest to both systems 103 and 105. It is noted that incompatibility of data can involve the actual data structure.

The process integration system 101 makes the converted or integrated data available to the client system 105 to ensure that the client system 105, and any other system, has access to compatible data and status information. In exemplary embodiments, the process integration system 101 also makes the data, as well as any estimated status information, available to the source systems 103. The process integration system 101, source systems 103, and client system 105 may communicate over a data network 107, such as the Internet or any other type of public or private network. Various secure file transfer protocols may be used to securely convey files and data to be processed from one or more source systems 103 to process integration system 101 and from process integration system 101 to one or more source systems 103 over one or more communication links (or connections) 119. Likewise, in a bidirectional manner, various secure file transfer protocols may be used to securely convey files and data from one or more client systems 105 to process integration system 101 and from process integration system 101 to one or more source systems 103. For example, the one or more client systems 105 may monitor one or more predetermined tasks and request the process integration system 101 to provide an asynchronous response regarding the status of the one or more predetermined tasks. Links 119 may include wired (e.g. coaxial cable, twisted pair, fiber optic cable) and/or wireless connections.

In the example of FIG. 1, system 100 includes various communication networks, such as a data network 107 and wireless network 109; these networks 107 and 109 can support telephony services for a mobile terminal to communicate over a telephony network 113 (e.g., Public Switched Telephone Network (PSTN). In this manner, source system 103 and client system 105 can place and receive calls from, for example, a voice terminal. For the purpose of illustration, the wireless network 109 can include a radio network that supports a number of wireless terminals, which may be fixed or mobile, using various radio access technologies. According to one exemplary embodiment, radio technologies that can be contemplated include: first generation (1G) technologies (e.g., advanced mobile phone system (AMPS), cellular digital packet data (CDPD), etc.), second generation (2G) technologies (e.g., global system for mobile communications (GSM), interim standard 95 (IS-95), etc.), third generation (3G) technologies (e.g., code division multiple access 2000 (CDMA2000), general packet radio service (GPRS), universal mobile telecommunications system (UMTS), etc.), 4G, etc. For instance, various mobile communication standards have been introduced, such as first generation (1G) technologies (e.g., advanced mobile phone system (AMPS), cellular digital packet data (CDPD), etc.), second generation (2G) technologies (e.g., global system for mobile communications (GSM), interim standard 95 (IS-95), etc.), third generation (3G) technologies (e.g., code division multiple access 2000 (CDMA2000), general packet radio service (GPRS), universal mobile telecommunications system (UMTS), etc.), and beyond 3G technologies (e.g., third generation partnership project (3GPP) long term evolution (3GPP LTE), 3GPP2 universal mobile broadband (3GPP2 UMB), etc.).

Complementing the evolution in mobile communication standards adoption, other radio access technologies have also been developed by various professional bodies, such as the Institute of Electrical and Electronic Engineers (IEEE), for the support of various applications, services, and deployment scenarios. For example, the IEEE 802.11 standard, also known as wireless fidelity (WiFi), has been introduced for wireless local area networking, while the IEEE 802.16 standard, also known as worldwide interoperability for microwave access (WiMAX) has been introduced for the provision of wireless communications on point-to-point links, as well as for full mobile access over longer distances. Other examples include Bluetooth™, ultra-wideband (UWB), the IEEE 802.22 standard, etc.

According to certain embodiments, a service provider network 117 includes the process integration (or data processing) system 101; under this arrangement, the process integration (or data processing) service can be provided as a managed service by the service provider 117. It should be noted that various other types of networks may also be present within system 100 and are not limited to the described systems. Subscribers, for example, source systems 103 and client systems 105 are also shown within FIG. 1 in communication with the assortment of networks. It should also be noted that the source system 103 and/or the client system 105 may be associated with one or more of the described networks including the wireless network 109 and the telephony network 113.

In certain embodiments, the process integration system 101 retrieves data from source system 103 over data network 107 for processing in the form of files (e.g., raw data files). Various secure file transfer protocols may be used to convey these files from source system 103 to process integration system 101, and from process integration system 101 to client system 105. The links 119 that carry the data files may include both wired (e.g., coaxial cable, twisted pair, fiber optic cable) as well as wireless connections.

Figure 2:
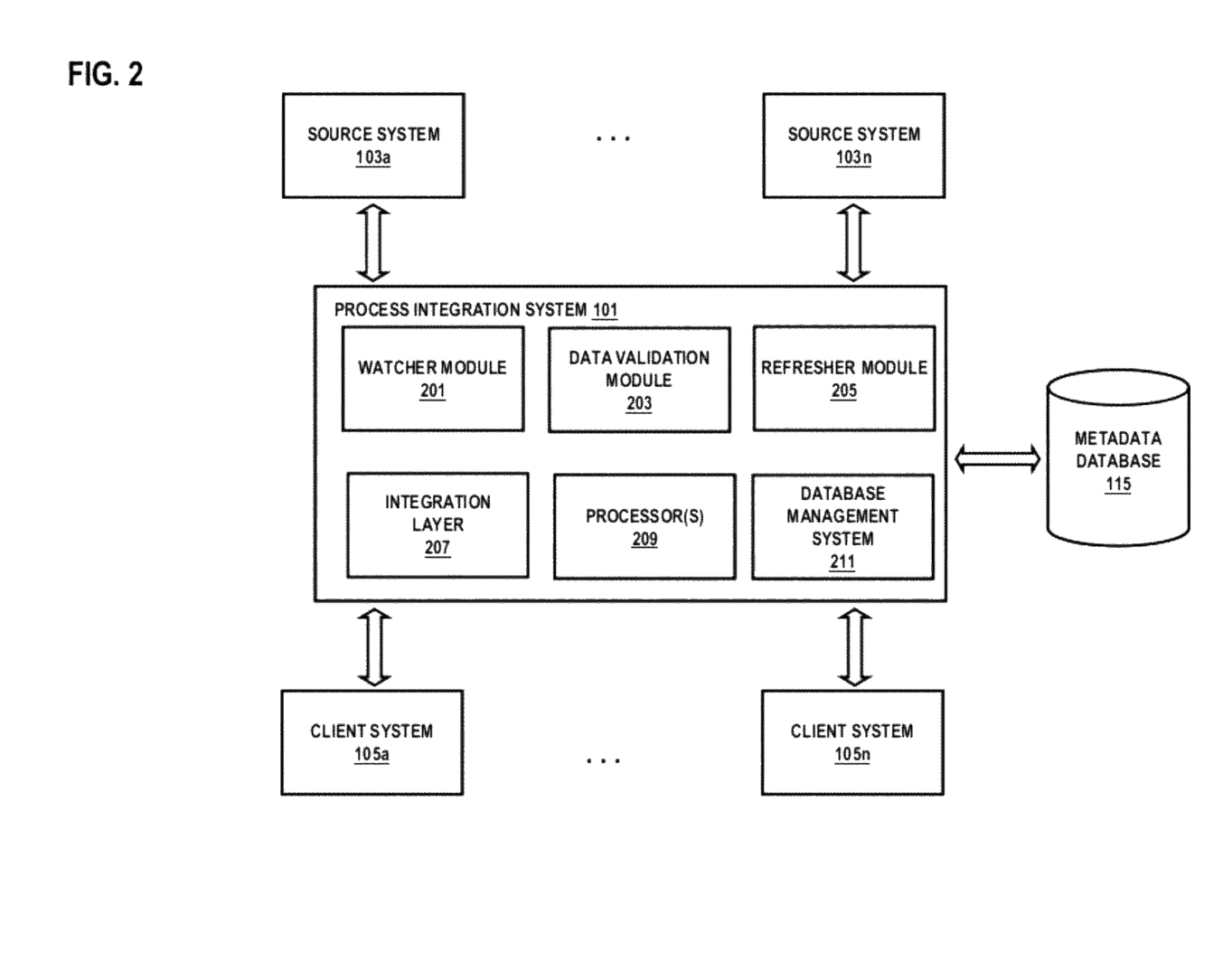
FIG. 2 is a diagram of a process integration system configured to operate in the system of FIG. 1, according to an exemplary embodiment.
Figure 3:
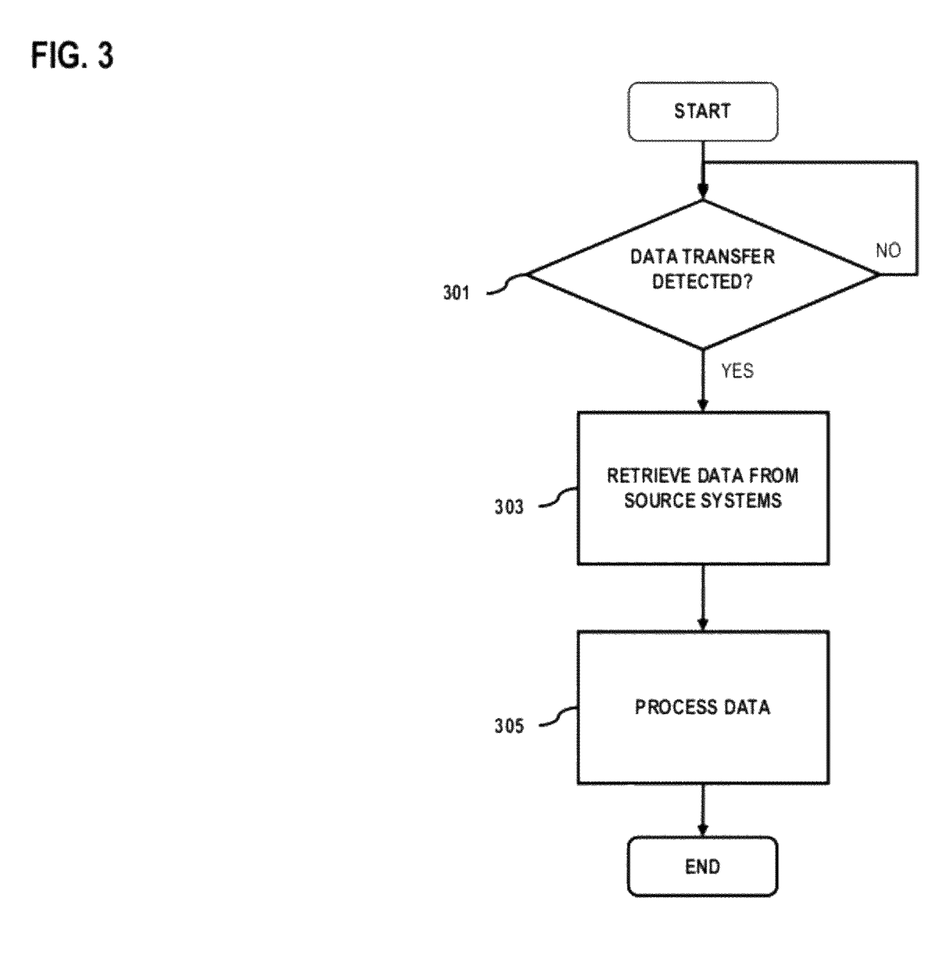
FIG. 3 is a flowchart of a process for obtaining data for integration, according to an exemplary embodiment.

Processing of the data files can be executed at the process integration system 101, as now explained with respect to FIGS. 2 and 3.

FIG. 2 is a diagram of a process integration system configured to operate in the system of FIG. 1, according to an exemplary embodiment. Process integration system 101, in certain embodiments, comprises the following components: a watcher module 201, a data validation module 203, a refresher module 205, an integration layer 207, one or more processors 209, and a database management system (DBMS) 211, which collectively implement the data integration and processing functionality.

Watcher module 201 watches for the arrival of a file or data from source systems 103 and collects such file or data. The arrival of a file or data can be in accordance with a pre-established date and time for the arrival of the file or data. In exemplary embodiments, watcher module 201 can retrieve files or data from the source systems 103. For example, watcher module 201 can retrieve a file or data based on a request that is submitted by a client system 105 or a source system 103. Similarly, watcher module 201 can retrieve a file or data at predetermined times.

Data validation module 203 can extract workflow data from the collected data and check for the integrity of the data from the source systems 103, for example, by validating the data (e.g., records) against a predetermined data source to determine incomplete or missing information, or for formatting or data structure differences. The workflow data can be associated with a workflow of one or more tasks that are monitored by the process integration system 101. Refresher module 205 refreshes (or updates) the data that is collected by the process integration system 101. In exemplary embodiments, the refresher module updates the OLAP cubes that are built from the database 115. The refresher module 205 can monitor the movement of cubes by monitoring the status in a base table maintained in the database 115. Based on a status update in the metadata table, a cube refresh task status can be updated to completed or aborted status, to close the monitoring of a particular task.

According to certain embodiments, integration layer (or interface gateway) 207 causes the identification of the one or more predetermined tasks associated with execution of a workflow based on the workflow data. The predetermined tasks can be associated with any enterprise function or operation. For example, one or more of the predetermined tasks can be associated with a periodic close process, such as a month end close utilized in business environment. The periodic close process can be the financial accounting needed to close out the end of a month, or any other period. During such a process, team leaders and/or managers may predetermine tasks that must be completed prior to completion of the periodic close process. The process integration system 101 can allow the team leaders and/or managers to have updated information relating to the progress of any one of the one or more predetermined tasks, by following the monitoring and status updates pertaining to the workflow of the tasks monitored by the process integration system 101. The process integration system 101 can provide an asynchronous response by utilizing the web service based framework.

Watcher module 201 also provides estimated status information relating to the progress of the workflow. For example, watcher module 201 can estimate status information relating to progress of a workflow towards completion that is monitored by the process integration system 101 by correlating the workflow data with the one or more predetermined tasks based on underlying metadata of the workflow data. The data may be related to the execution of workflow, in which, the watcher module 201 reports a status relating to progress of completion by correlating the workflow data with the one or more predetermined tasks. Additionally, watcher module 201 generates and transmits reports (e.g., fall out report) relating to various processes and sub-processes of the integration procedure. The reports can be in various forms that are compatible with the one or more client systems 105 and can travel by various forms of communication. For example, the reports can be in the form of updated dashboards, emails, printouts, facsimile messages, etc., or any combination thereof. The type of report and communication can be set and stored in a user profile of the source systems 103 or client systems 105, or set and stored in a system profile of the process integration system 101.

DBMS 211 controls the creation, the maintenance, and the use of databases, such as the metadata database 115. As such, it may provide methods of controlling data access, enforcing data integrity, managing concurrency, and restoring the database from backups. The DBMS 211 may allow different applications or users to easily store, update, or retrieve data in the database 115. For instance, the DBMS 211 may enable different applications or users to store, update, or retrieve data in a structured way (e.g., OLAP cubes). To accomplish this, the DBMS 211 may utilize various database models, such as the navigational model, the relational model, the object-oriented model, etc., or any combination thereof.

Although processors 209 are shown to be part of the process integration system 101, it is contemplated that the processors 209 can reside externally from the process integration system 101; moreover, these processors can be implemented as multiple servers, work stations, mainframes, or a combination thereof.

FIG. 3 is a flowchart of a process for obtaining data for integration, according to an exemplary embodiment. For illustrative purposes, the process is described with reference to FIG. 1. It is noted that the steps of the process may be performed in any suitable order, as well as combined or separated in any suitable manner. In step 301, the process integration system 101 determines whether data transfer has occurred from one or more source systems 103. The process integration system 101 may detect data transfer within one of the one or more source system 103, between the one or more source systems 103, or to systems outside the one or more source systems 103. By way of example, the process integration system 101 may detect data files being sent to various close management groups to consolidate the data for each period (e.g., day, week, month, etc.). The process integration system 101 may also detect OLAP cubes being built from a database in response to data being uploaded to a database, such as the metadata database 115. The process integration system 101 may further detect data being moved from one system to another system by determining whether relevant transformations have occurred (e.g., transformation of storage types, formats, etc.).

In step 303, process integration system 101 retrieves data from the one or more source systems 103. The retrieval of data may be over the data network 107 via communication links 119, for instance, over a secure communication session using various Secure File Transfer Protocols (SFTPs) (e.g., Secure Shell (SSH) File Transfer Protocol). In addition, the communication session could be in the form of emails, instant message chat sessions, telephone calls, etc. The retrieval of data may be over the data network 107 via communication links 119, for instance, over a secure communication session using various Secure File Transfer Protocols (SFTPs) (e.g., Secure Shell (SSH) File Transfer Protocol). In addition, the communication session could be in the form of emails, instant message chat sessions, telephone calls, etc.

In step 305, process integration system 101 processes the data in order to provide an estimated status for the periodic close process. As further explained in FIG. 6, the process may involve collecting retrieved data, extracting and validating workflow data from the collected data, identifying one or more predetermined task associated with the workflow data, adding/subtracting such tasks, refreshing the collected data, storing the collected and workflow data, estimating status information associated with the collected data, and reporting the estimated status information to the one or more client systems 105.

Figure 4:
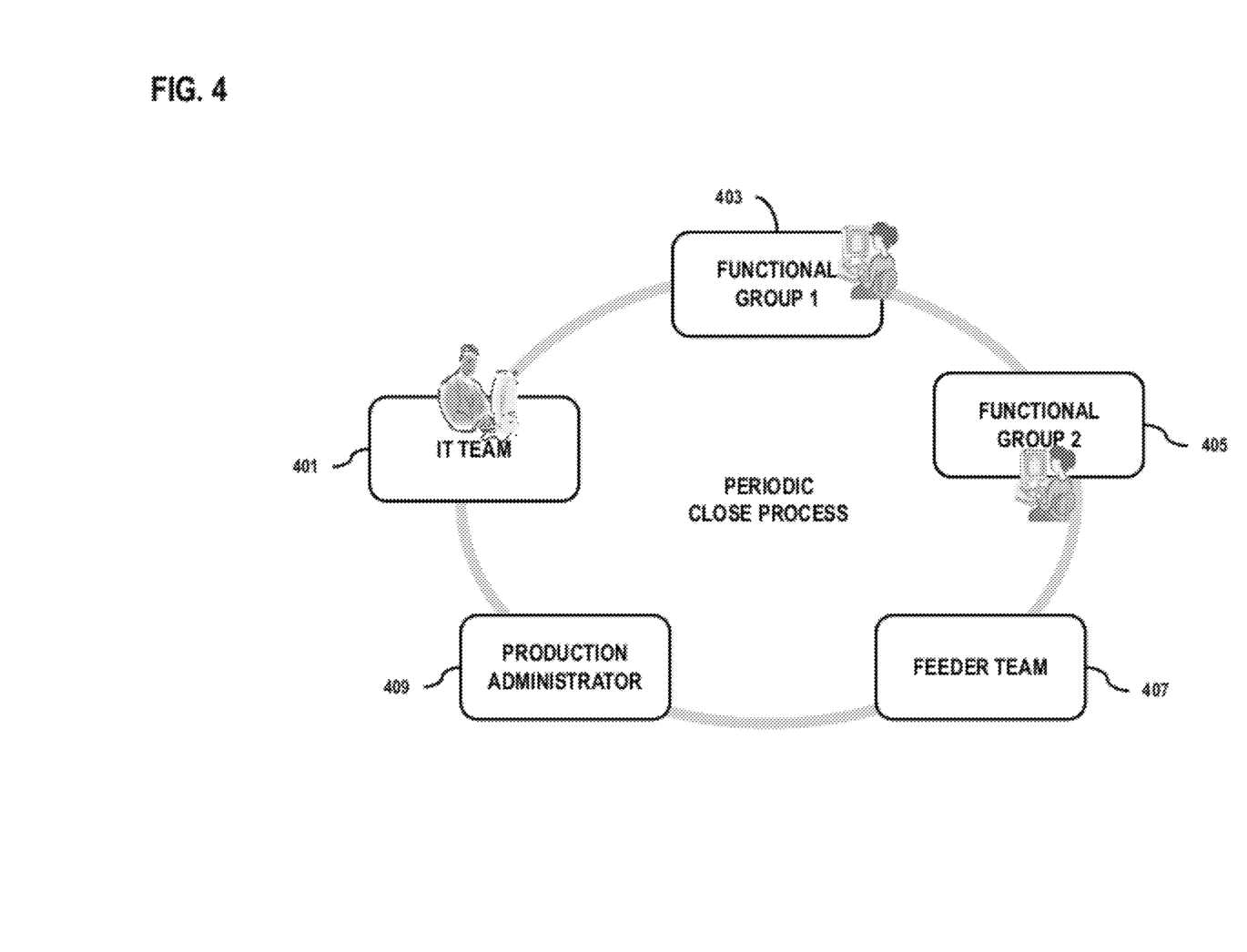
FIG. 4 is a diagram of members associated with a periodic close process, according to an exemplary embodiment.

FIG. 4 is a diagram depicting various members that may be associated with a periodic close process, according to an exemplary embodiment. Specifically, FIG. 4 demonstrates members (e.g., members 401-409) that may participate in the periodic close process. The members may include, but are not limited to an IT team 401, functional groups 1 and 2 (403 and 405), feeder team 407, and production administrator 409. By way of example, the feeder team may transfer financial accounting data to functional groups, such as functional group 1 and functional group 2, to be consolidated for the periodic close process. As the data is transferred, the process integration system 101 may detect the data transfer and retrieve the data to be processed. To assist with the periodic close process, the process integration system 101 may identify errors associated with the retrieved data and notify the functional group associated with the retrieved data and the IT team. Accordingly, data errors, including omissions, may be caught and corrected early in the periodic close process either by the IT team or the functional group associated with retrieved data. In certain embodiments, it is noted that the process integration system 101 may also automatically recommended potential error resolutions or resolve the data errors.

Moreover, when the feeder team transfers the financial accounting data to the functional groups, the process integration system 101 may also estimate status information for the data and provide the estimated status information to a production administrator. Similarly, when a data error, such as an omission, is corrected by either the IT team or the functional group associated with the retrieved data, the process integration system 101 may also provide estimated status information to the production administrator. As such, the production administrator may consolidate the estimated status information so that it may be provided to the one or more client systems 105. Further, using the estimated status information, the production administrator may request additional financial accounting data, including omitted data, from the feeder team. In certain other embodiments, it is noted that the process integration system 101 may perform the functions provided by members of the periodic close process (e.g., members 401-409).

Figure 5:
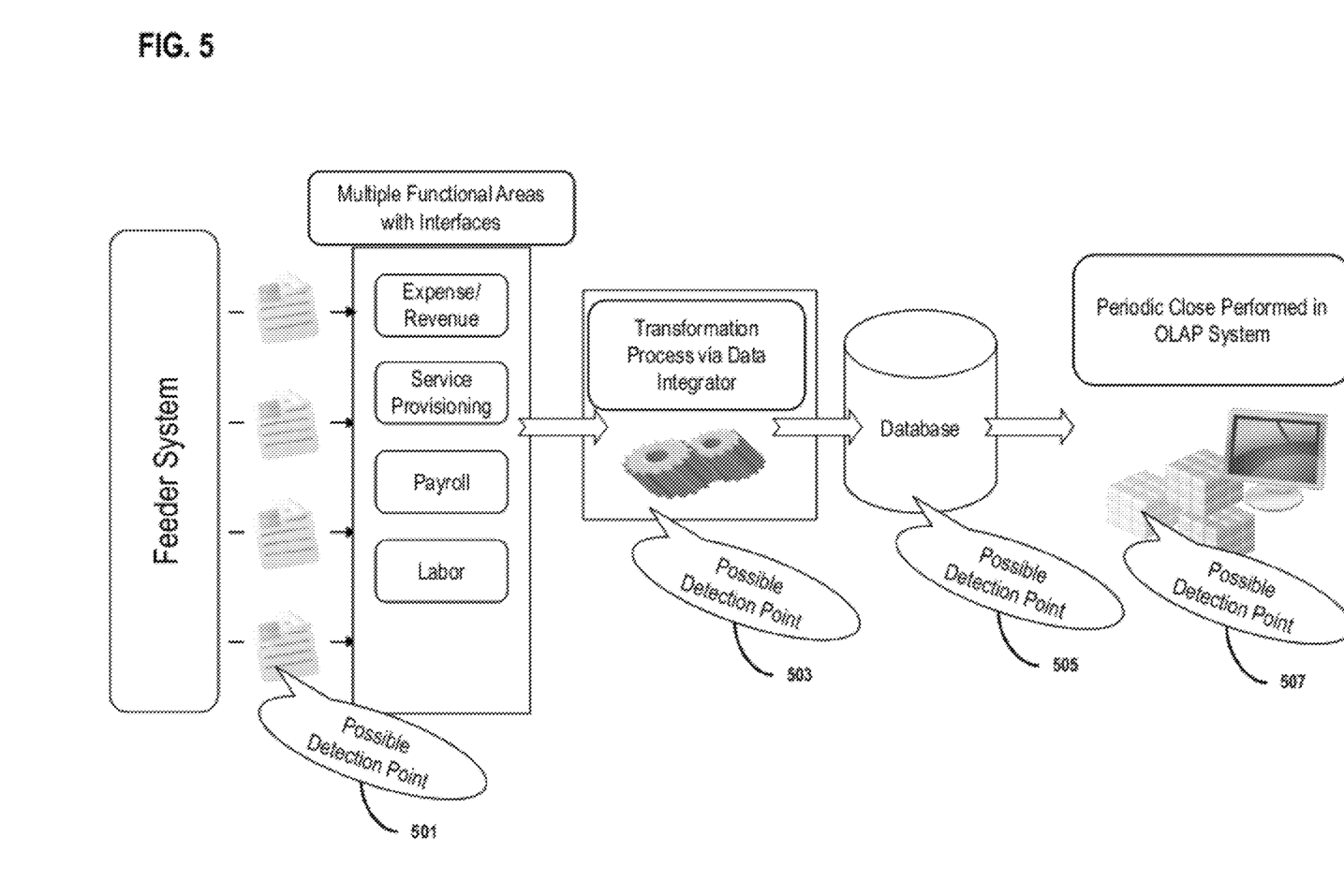
FIG. 5 is a diagram of a process integration system capable of having multiple detection points associated with a periodic close process, according to an exemplary embodiment.

FIG. 5 is a diagram demonstrating the detection of data associated with a periodic close process, according to an exemplary embodiment. Specifically, FIG. 5 illustrates a few detection points (e.g., points 501-507) where data may be processed and screened, for instance, to identify errors and omissions, or to provide estimated status information to the one or more client systems 105. As shown, data associated with the periodic close process may be detected at various stages. By way of example, the data may be detected as the data is transferred from one or more feeder/source systems (e.g., an automated or manual system from which information is derived) to the multiple functional areas, as the data is processed via a data integrator (e.g., Oracle® Data Integrator (ODI)), as the data is stored in a database, or as the data is provided to an OLAP system (e.g., Essbase, OBIEE, etc.).

Figure 6:
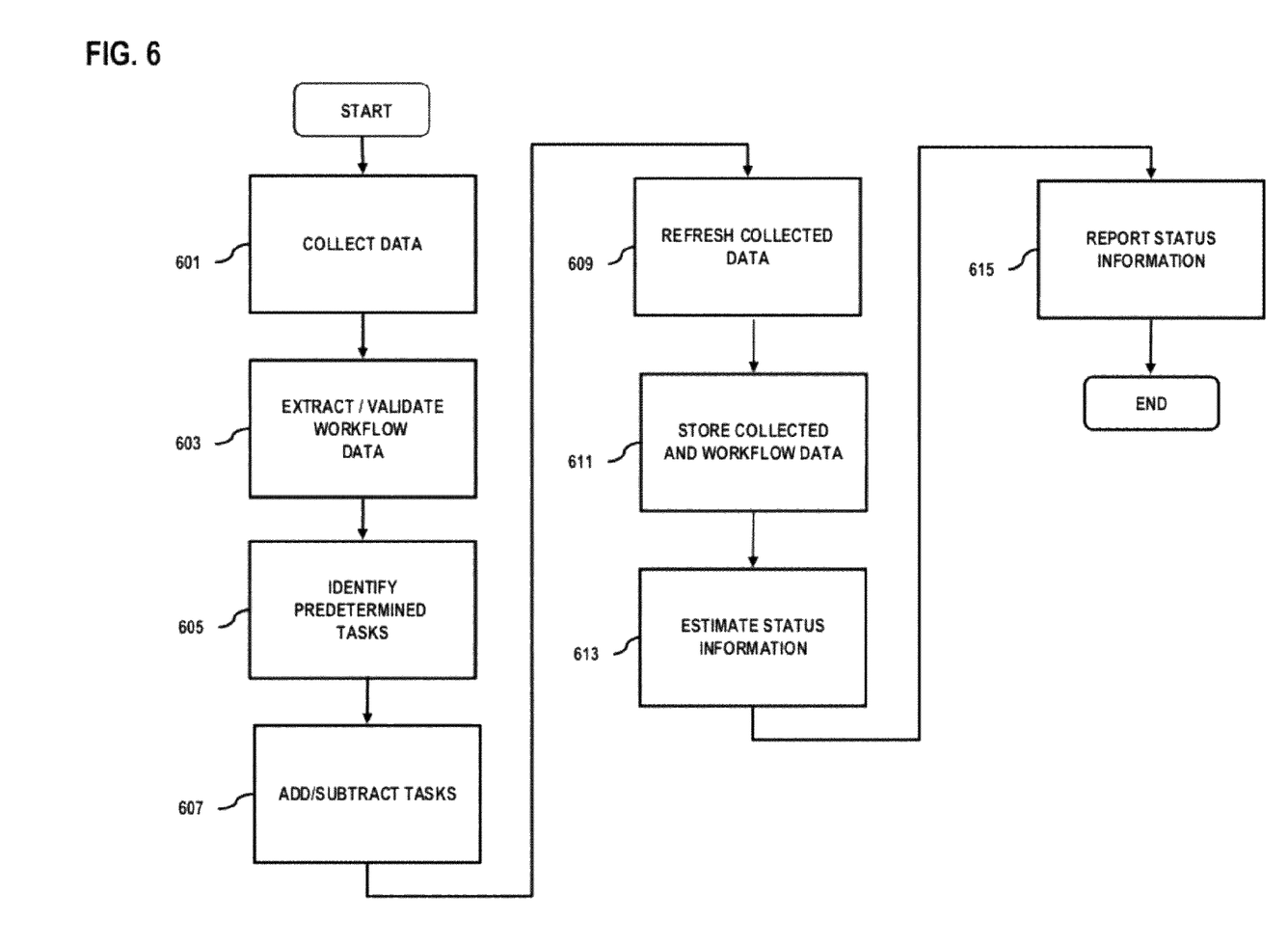
FIG. 6 is a flowchart of a data integration process, according to an exemplary embodiment.

FIG. 6 is a flowchart of a data integration process, according to an exemplary embodiment. For illustrative purposes, the process is described with reference to FIG. 1. It is noted that the steps of the process may be performed in any suitable order, as well as combined or separated in any suitable manner. In step 601, watcher module 201 watches for the arrival of a file or data from source systems 103 and collects such file or data. The process can involve transferring the data from one or more source systems 103 to the process integration system 101. The data may be transferred over the data network 107 via communication links 119; such transfer of data can also be secured using various SFTPs (e.g., Secure Shell (SSH) File Transfer Protocol). As mentioned, the communicate session could also be in the form of emails, instant message chat sessions, telephone calls, in-person conversations, etc.

Once the data securely arrives at process integration system 101, the collected data is processed in step 603 by the data validation module 203, which extracts workflow data from the collected data and checks for the integrity of the data from the source systems 103. The processing of the workflow data can include the performance of an integrity validation on the data to identify errors and omissions, such as missing telephone numbers, missing data fields, invalid telephone numbers, email addresses, or group identifications, etc. By validating the data transferred from one or more source systems 103, any missing and/or incorrect pieces of information can be effectively identified. In exemplary embodiments, errors can be identified at various stages of the process. For example, errors and omissions can be determined as the process integration system 101 collects data, as the data is processed, as the data is stored, and as the data is reported. The processing also includes processing the workflow data according to the needs and/or preferences of the one or more client systems 105. The processing may involve any necessary conversion or transformation of the validated data into a form that is acceptable and compatible with the client systems 105. The processed (e.g., converted) data is subsequently made available to the client systems 105, along with estimated status information, to be used for various purposes, as discussed later in step 615.

After completion of the validation process, in step 605, the integration layer 207 identifies one or more predetermined tasks associated with an execution of a workflow based on a reading of underlying metadata of the extracted workflow data. The reading of the underlying metadata can be facilitated by a web service utilizing WSDL calls, or by any other service that permits the reading of metadata. The web service framework of the process integration system 101 executes asynchronously. In exemplary embodiments, one or more additional tasks associated with the execution of the workflow can be added for monitoring, in step 607. Similarly, in other exemplary embodiments, one or more predetermined tasks can be subtracted, in step 607. The adding/subtracting of tasks provides scalability to the process integration system 101 such that source systems 103 and other external systems can be added, for example, via a web service call. The adding/subtracting of tasks can be accomplished by adding/subtracting of metadata associated with predetermined tasks, respectively. By adding/subtracting tasks via the use of metadata, the process integration system is easy to maintain.

In particular embodiments, the collected data is refreshed in step 609. In refreshing the collected data, the refresher module 205 initiates an update on the collected data. For example, in other embodiments, the refresher module 205 requests the watcher module 201 to check for updates to previously collected data and/or data from source systems 103 that has not previously arrived or been collected. The integration process may, on occasion, result in one or more failed integrations, owing to a number of reasons. In recognition of this, the process integration system 101, in certain embodiments, is able to retry a failed integration task(s), in step 609, to restart from the point of failure in the process. The refresher module 205 can identify points of failures and eliminate omissions. The refresh (or retry) function can be performed at an entity level, transaction level, group level (i.e., a set of transactions may be configured into one group) or at a source system level where the integration layer 207 may be engaged to perform such process. An invalid or failed integration may also be aborted by the integration layer 207, per step 609. In addition, the integration layer 207 may also allow for the forceful completion of failed transactions to move forward with the remaining steps in the integration activity, in step 609.

The collected data and the workflow data are stored by the integration system in step 611. The data can be stored in a memory, for example, in metadata database 115, or any other form of memory. The data can be stored in various forms, depending on system compatibilities and preferences set in a system profile, or a user profile. For example, the data can be stored as an object, metadata, tables, chart, etc.

In step 613, the watcher module 201 estimates status information relating to the progress of a workflow being monitored by the process integration system 101. The monitored progress is towards completion of the workflow, by which the workflow data is correlated with the one or more predetermined tasks based on underlying metadata of the workflow data. For example, the data can be related to the execution of workflow, in which, the watcher module 201 estimates status information relating to the progress of execution of the workflow.

In step 615, the watcher module 201 reports the estimated status information to the one or more client systems 105. Any errors that arise are consequently reported, as in step 615, by the watcher module 201. These errors may then be automatically or manually corrected, and any missing/invalid information may be replaced with the correct data, by the source systems 103, the client systems 105, or the process integration system 101. In addition, the watcher module 201 may report errors or missed files and processes by signaling an audio or video alarm. The newly processed and integrated data may also be communicated (reported) to the client systems 105, along with or separate from the status information in step 615. The integrated data is supplied to the client system 105, in exemplary embodiments, in response to a request for such data. In particular embodiments, the integrated data is supplied to the client system 105, on a continuous basis. For example, the integrated data may be provided whenever such data becomes available, and/or updated. The client system 105 could have access to integrated data based on various conditions, that are not limited to a subscription, or being a member of an enterprise.

Figure 7:
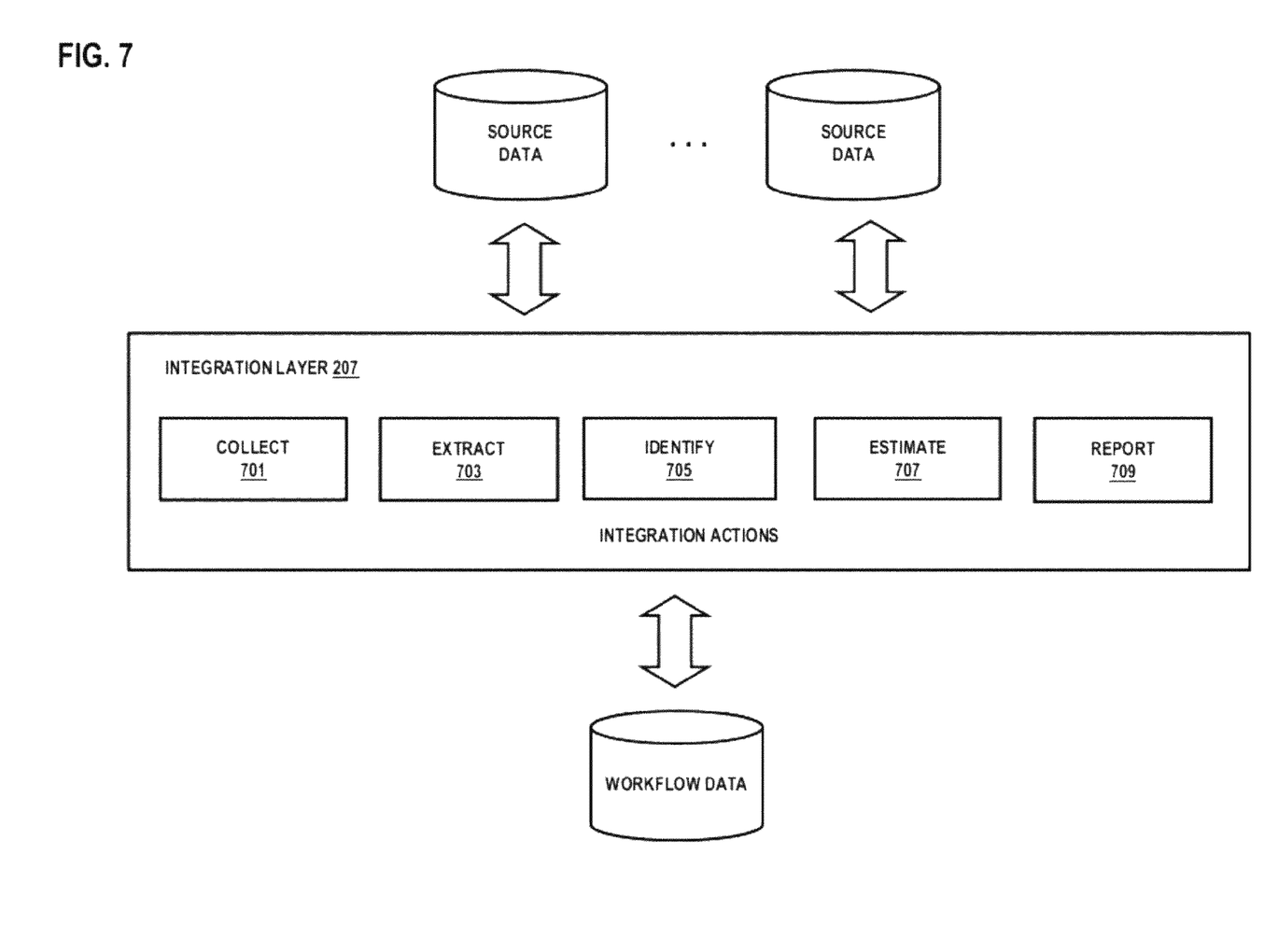
FIG. 7 is a diagram of various integration actions that can be performed by the integration system of FIG. 2, according to an exemplary embodiment.

FIG. 7 is a diagram of various integration actions that can be performed by the process integration system 101 of FIG. 1, according to an exemplary embodiment. In this example, process integration system 101, via integration layer 207, directs the following actions or functions: collect 701, extract 703, identify 705, estimate 707, and report 709. According to particular embodiments, actions or functions 701-709, facilitate the transfer of a report of the estimated status information, as well as the workflow data. The collect action 701 initiates the integration process by instructing the watcher module 201 to watch for the arrival of files and data associated with the execution of one or more processes from one or more source systems 103, and to collect such files and data. The extract action 703 instructs the data validation module 203 to extract workflow data from the collected data and to validate the data being retrieved from one or more source systems. The identify action 705 initiates the integration layer 207 to identify one or more predetermined tasks associated with an execution of a workflow based on a reading of underlying metadata of the extracted workflow data. In addition, estimate action 707 initiates the watcher module 201 to estimate the status information relating to progress of the workflow towards completion by correlating the workflow data with the one or more predetermined tasks. The report action 709 causes the watcher module 201 to make available and/or report the estimated status information to the one or more client systems 105.

The described processes and arrangements, in certain embodiments, provide efficient data integration, while minimizing the use of valuable system and network resources.

Figure 8:
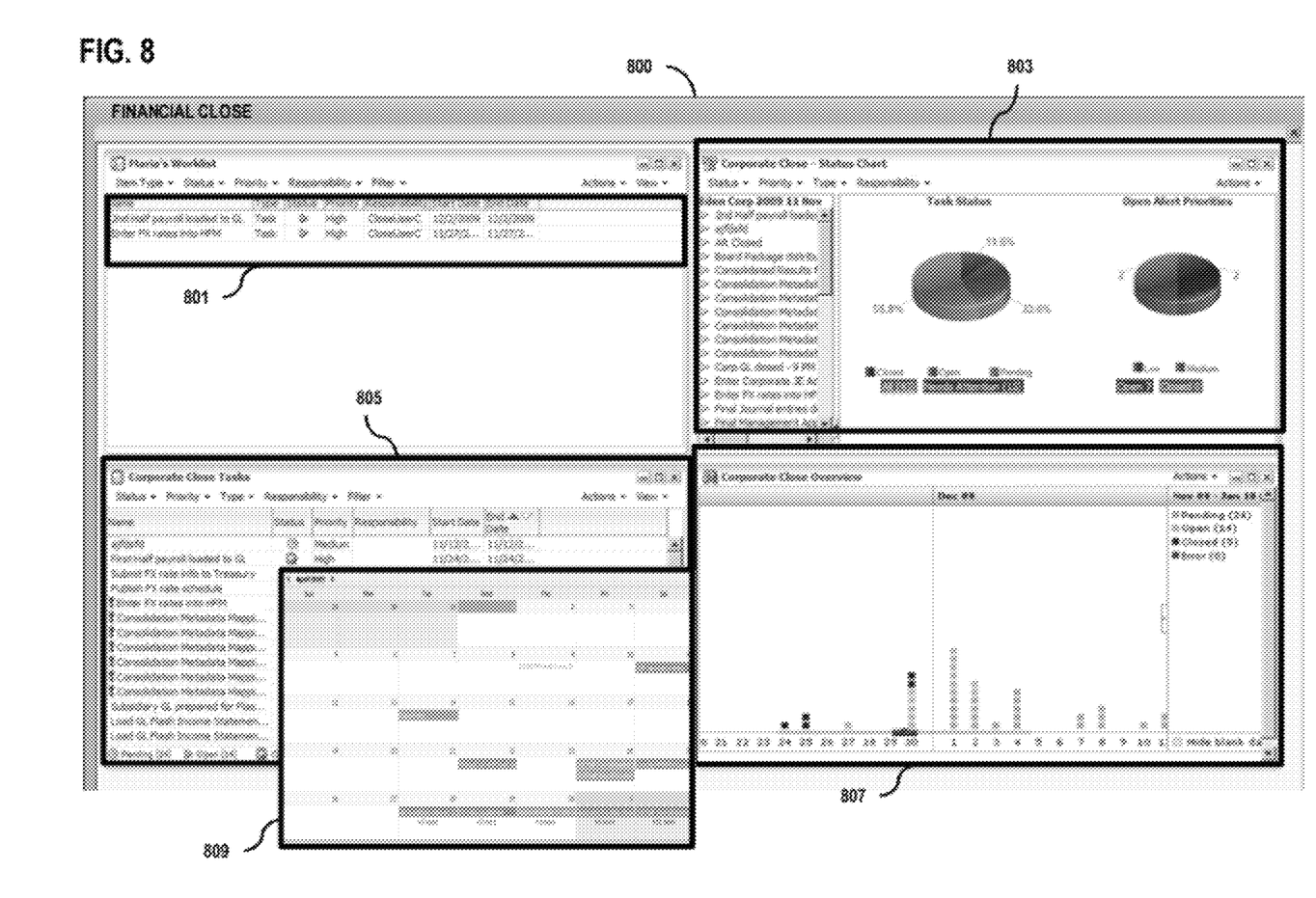
FIG. 8 is a diagram of a user interface configured to operate in the system of FIG. 1, according to an exemplary embodiment.

FIG. 8 is a diagram of a user interface configured to operate in the system of FIG. 1, according to an exemplary embodiment. The user interface 800 features views 801-809 associated with a periodic close process. Specifically, the user interface 800 is associated with a periodic financial close process. The views 801-809 may illustrate various customizable dashboards for providing tasks, statuses, summaries, etc. By way of example, the view 801 illustrates a dashboard that is customized for a particular participant of the periodic close process so that the participant is able to see his/her upcoming tasks. As the participant submits data associated with a task, the process integration system 101 may process the data. As such, the process integration system 101 may update the user interface 800 based on the estimated status information associated with the task. If the task is complete and free of errors, the process integration system 101 may, for instance, remove the task from the view 801 or mark it as completed in the view 801. However, if the task has errors or is missing financial-related information, the process integration system 101 may highlight the task in the view 801 or mark the task to indicate to the participant that he/she needs to revisit the task.

Moreover, as each participant of the periodic close process submits data associated with their tasks, the process integration system may update the individual dashboard for each participant in view 801 as well as the presentation of the views 803-809. For example, as the participants of the periodic close process submits data for their tasks, view 807 may be updated periodically or in real-time to reflect the data submissions. As shown, the tasks may be marked as pending, open, closed, or containing errors. In addition, the process integration system 101 may send update information, for instance, via email alerts to participants, supervisors, executives, etc.

The processes described herein for performing data integration may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
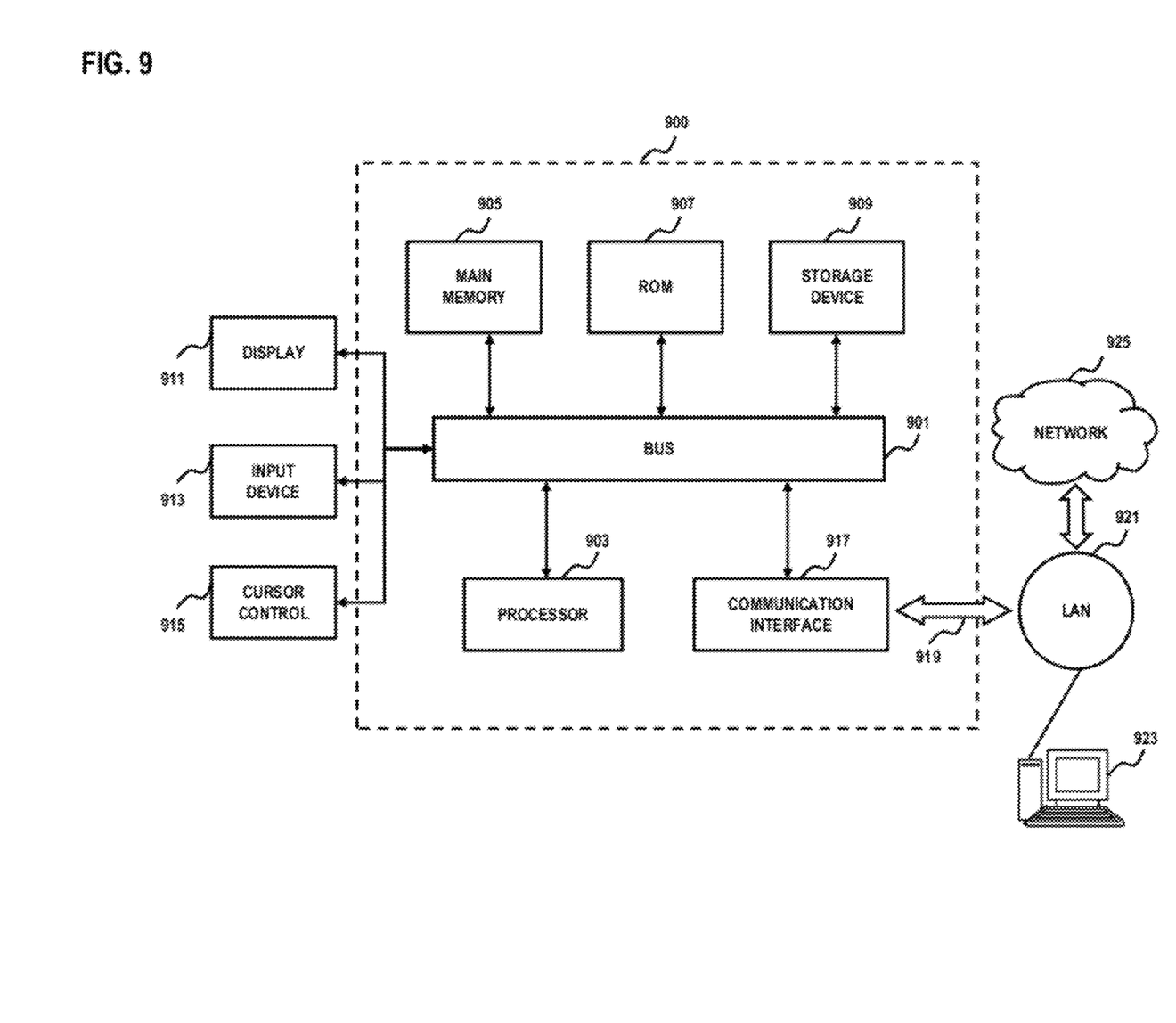
FIG. 9 is a diagram of a computer system that can be used to implement various exemplary embodiments.

FIG. 9 illustrates computing hardware (e.g., computer system) 900 upon which exemplary embodiments can be implemented. The computer system 900 includes a bus 901 or other communication mechanism for communicating information and a processor 903 coupled to the bus 901 for processing information. The computer system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

According to an exemplary embodiment, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement exemplary embodiments. Thus, exemplary embodiments are not limited to any specific combination of hardware circuitry and software.

Figure 10:
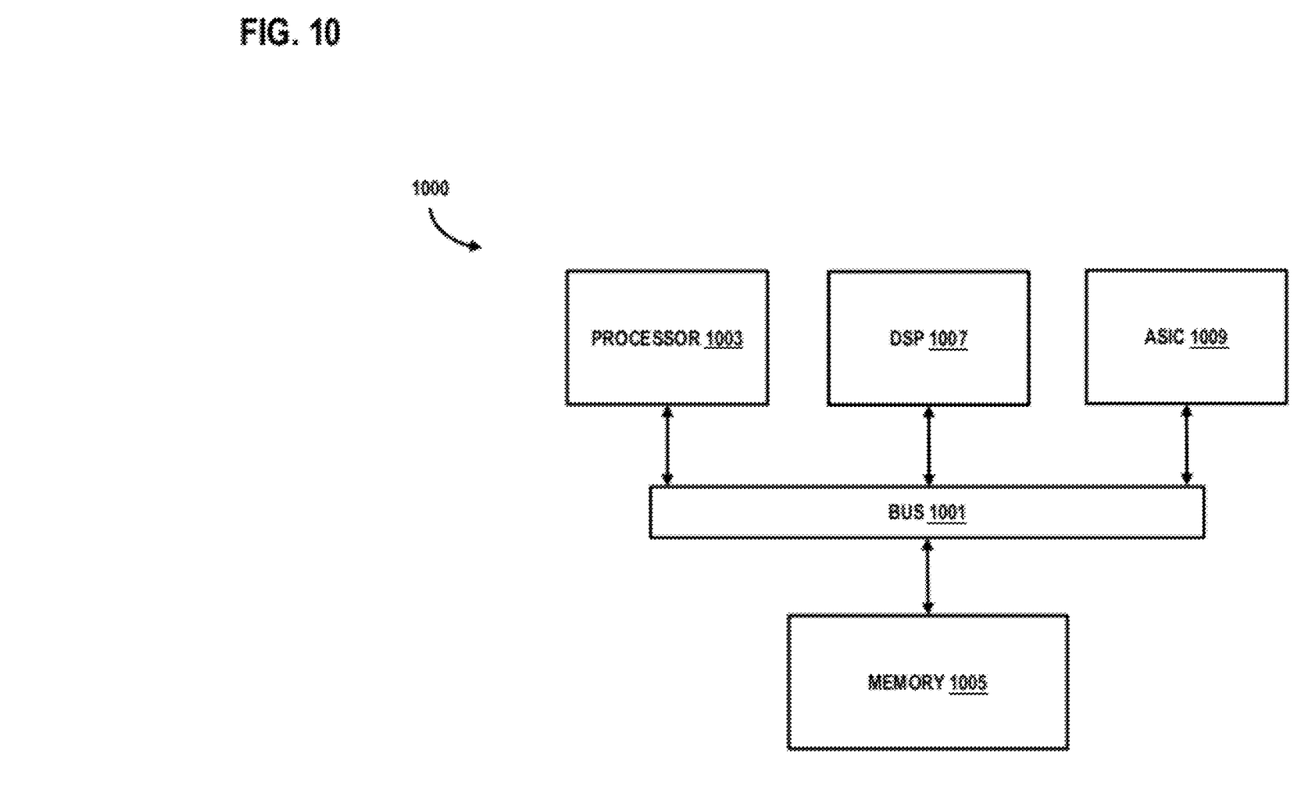
FIG. 10 is a diagram of a chip set that can be used to implement various exemplary embodiments.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g.

for Ethernet™ or an Asynchronous Transfer Model (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 10, multiple communication interfaces can also be employed.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an exemplary embodiment through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 10 illustrates a chip set 1000 upon which an embodiment of the invention may be implemented. Chip set 1000 is programmed to present a slideshow as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1000, or a portion thereof, constitutes a means for performing one or more steps of FIG. 3.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to presenting a slideshow via a set-top box. The memory 1005 also stores the data associated with or generated by the execution of the inventive steps.

Implementations described herein provide a generic ("one size fits all") interface gateway (integration layer) that can be used to implement any type of interface for various kinds of systems, such as ERP systems (e.g., SAP, PeopleSoft, etc.), Business Warehouse systems, Legacy systems, web services, business-to-business services, etc. The generic interface gateway includes a services component to implement a plurality of different types of services for processing data received at the interface gateway, the plurality of services being implemented as at least two of an Oracle Data Integration (ODI) service, a SAP service, a Java Web Service, or a Unix shell script. In addition, the generic interface gateway can handle single payload requests, as well as batch request, where the payload is very big. The generic interface gateway may include a metadata-driven orchestration component that acts as the heart of the interface gateway. Users may configure an interface for the interface gateway by configuring the metadata-driven orchestration component to invoke whatever types of services are needed for processing the collected and workflow data. The orchestration component may read the metadata for the given interface to be executed and orchestrate the services in the defined order. The orchestration component may also decide whether the services can be triggered in sequential or parallel mode.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   collecting data from one or more source systems that include a messaging application;
   extracting workflow data from the collected data;
   identifying one or more predetermined tasks associated with execution of a workflow based on a reading of underlying metadata of the workflow data;
   estimating status information relating to progress of the workflow towards completion by correlating the workflow data with the one or more predetermined tasks;
   detecting a failure condition associated with the execution of one of the one or more predetermined tasks associated with the workflow;
   restarting the workflow from a point of where the failure condition is detected, wherein restarting the workflow comprises retrying the one of the one more predetermined tasks associated with the workflow for which the failure condition is detected, wherein the execution of the workflow comprises executing a close process for a financial accounting procedure, and wherein the close process is for a predetermined time period;
   collecting updated data from one or more of the source systems;
   extracting updated workflow data from the collected updated data; and
   estimating updated status information relating to progress of the workflow towards completion by correlating the updated workflow data with the one or more predetermined tasks based on the underlying metadata of the workflow data.

2. The method according to claim 1, further comprising reporting the estimated status information to one or more client systems.

3. The method according to claim 1, wherein the one or more predetermined tasks are scalable by subtracting metadata.

4. The method according to claim 1, further comprising implementing a plurality of different types of services for processing the collected data, the plurality of services being implemented as one or more of an Oracle Data Integration (ODI) service, a SAP service, a Java Web Service, and a Unix shell script.

5. The method according to claim 1, wherein the one or more source systems also include a productivity application.

6. An apparatus comprising:
   at least one processor; and
   at least one memory including computer program code,
   the at least one memory and the computer program code configured to, with the at least one processor, cause the apparatus to perform at least the following,
   collect data from one or more source systems that include a messaging application,
   extract workflow data from the collected data,
   identify one or more predetermined tasks associated with execution of a workflow based on a reading of underlying metadata of the workflow data,
   estimate status information relating to progress of the workflow towards completion by correlating the workflow data with the one or more predetermined tasks,
   detect a failure condition associated with the execution of one of the one or more predetermined tasks associated with the workflow,
   restart the workflow from a point of where the failure condition is detected,
   wherein restart the workflow comprises to retry the one of the one more predetermined tasks associated with the workflow for which the failure condition is detected wherein the execution of the workflow comprises executing a close process for a financial accounting procedure, and
   wherein the close process is for a predetermined time period,
   collect updated data from one or more of the source systems,
   extract updated workflow data from the collected updated data, and
   estimate updated status information relating to progress of the workflow towards completion by correlating the updated workflow data with the one or more predetermined tasks based on the underlying metadata of the workflow data.

7. The apparatus according to claim 6, wherein the apparatus is further caused to report the estimated status information to one or more client systems.

8. The apparatus according to claim 6, wherein the one or more predetermined tasks are scalable by subtracting metadata.

9. The apparatus according to claim 6, wherein the apparatus is further caused to implement a plurality of different types of services for processing the collected data, the plurality of services being implemented as one or more of an Oracle Data Integration (ODI) service, a SAP service, a Java Web Service, and a Unix shell script.

10. The apparatus according to claim 6, wherein the one or more source systems also include a productivity application.

11. A system comprising:
    a watcher module configured to collect data from one or more source systems that include a messaging application, and configured to extract workflow data from the collected data; and
    an integration layer configured to identify one or more predetermined tasks associated with execution of a workflow based on a reading of underlying metadata of the workflow data, wherein the integration layer detects a failure condition associated with the execution of the one of the one or more predetermined tasks associated with execution of the workflow, and restarts the workflow from a point of where the failure condition is detected, wherein the watcher module is further configured to estimate status information relating to progress of the workflow towards completion by correlating the workflow data with the one or more predetermined tasks based on the underlying metadata of the workflow data, wherein the execution of the workflow comprises executing a close process for a financial accounting procedure, and wherein the close process is for a predetermined time period, wherein the watcher module is further configured to: collect updated data from one or more of the source systems, extract updated workflow data from the collected updated data, and estimate updated status information relating to progress of the workflow towards completion by correlating the updated workflow data with the one or more predetermined tasks based on the underlying metadata of the workflow data.

12. The system according to claim 11, wherein the integration layer is further configured to implement a plurality of different types of services for processing the collected data, the plurality of services being implemented as one or more of an Oracle Data Integration (ODI) service, a SAP service, a Java Web Service, and a Unix shell script.

13. The system according to claim 11, wherein the one or more source systems also include a productivity application.

* * * * *